US012698193B2

(12) United States Patent
Siciliano et al.

(10) Patent No.: US 12,698,193 B2
(45) Date of Patent: Aug. 4, 2026

(54) DECAPPER

(71) Applicant: Express Scripts Strategic Development, Inc., St. Louis, MO (US)

(72) Inventors: Joseph A. Siciliano, Zionsville, IN (US); Darrin J. McMahon, Pittsboro, IN (US)

(73) Assignee: Express Scripts Strategic Development, Inc., St. Louis, MO (US)

( * ) Notice: Subject to any disclaimer, the term of this patent is extended or adjusted under 35 U.S.C. 154(b) by 0 days.

(21) Appl. No.: 18/219,891

(22) Filed: Jul. 10, 2023

(65) Prior Publication Data

US 2025/0019218 A1 Jan. 16, 2025

(51) Int. Cl.
*B67B 7/18* (2006.01)

(52) U.S. Cl.
CPC .................................... *B67B 7/182* (2013.01)

(58) Field of Classification Search
CPC ........... B67B 7/18; B67B 7/182; B65B 69/00; B01L 3/00; B01L 3/50825
USPC ..... 53/317, 331.5, 381.4, 390, 492; 81/3.25; 422/297
See application file for complete search history.

(56) References Cited

U.S. PATENT DOCUMENTS 2,005,410 A * 6/1935 Balz .......................... B67B 7/18 81/3.25
2,940,229 A * 6/1960 Baker ..................... B67B 7/164 53/492
3,653,176 A 4/1972 Gess
3,686,824 A * 8/1972 Rink ....................... B67B 7/182 53/381.4
4,030,271 A * 6/1977 Kefauver .............. B67B 3/2006 53/305
4,351,679 A 9/1982 Dreher
4,363,685 A 12/1982 White
4,647,333 A 3/1987 Voltmer
4,668,327 A 5/1987 Voltmer
5,819,508 A * 10/1998 Kraft ....................... B67B 7/182 53/492
5,826,409 A * 10/1998 Slepicka ................... B67B 7/00 53/492

(Continued)

FOREIGN PATENT DOCUMENTS

CN 110510559 A 11/2019
CN 210973811 U 7/2020

(Continued)

*Primary Examiner* — Linda J. Hodge
(74) *Attorney, Agent, or Firm* — Stinson LLP

(57) ABSTRACT

Systems and methods for removing a cap or lid from a container are disclosed. The systems include a decapper for removing a cap from a body of a container. The decapper includes a base configured to rest on a support surface and a prime mover supported by the base. A cap remover is supported by the base and is rotatable relative to the base about an axis of rotation. The cap remover is arranged to engage the cap of the container. The prime mover is operatively coupled to the cap remover to rotate the cap remover about the axis of rotation to remove the cap from the body of the container when the cap is engaged with the cap remover. The cap remover is arranged relative to the base such that the axis of rotation is oriented generally horizontally when the base rests on the support surface.

19 Claims, 6 Drawing Sheets

(56) References Cited

U.S. PATENT DOCUMENTS

| | | | | |
|---|---|---|---|---|
| 6,142,039 | A * | 11/2000 | Herring, Sr. | B67B 7/00 53/381.4 |
| 6,413,345 | B1 | 7/2002 | Treleaven | |
| 6,511,569 | B1 | 1/2003 | Nixon | |
| 7,409,809 | B1 | 8/2008 | Degen | |
| 7,421,831 | B2 | 9/2008 | Neeper | |
| 8,196,375 | B2 | 6/2012 | Kohanski | |
| 8,474,225 | B2 | 7/2013 | Kramer | |
| 9,091,322 | B2 | 7/2015 | Wang | |
| 9,592,733 | B2 | 3/2017 | Lyle | |
| 9,697,335 | B2 | 7/2017 | Joplin | |
| 9,853,532 | B2 | 12/2017 | Ionel | |
| 10,111,381 | B2 | 10/2018 | Shaffer | |
| 10,384,754 | B2 | 8/2019 | Cho | |
| 10,670,066 | B2 | 6/2020 | Engelen | |
| 10,865,006 | B2 | 12/2020 | Hoffman | |
| 10,959,372 | B2 | 3/2021 | Goman | |
| 2006/0053761 | A1 | 3/2006 | Lougheed | |
| 2011/0289889 | A1* | 12/2011 | Kohanski | B01L 3/50853 81/3.4 |
| 2014/0058555 | A1 | 2/2014 | Rhoads, Jr. | |
| 2016/0136839 | A1 | 5/2016 | Conroy | |
| 2016/0238627 | A1 | 8/2016 | Raicu | |
| 2018/0105207 | A1 | 4/2018 | Maile | |
| 2020/0158746 | A1 | 5/2020 | Rose | |

FOREIGN PATENT DOCUMENTS

| | | | | |
|---|---|---|---|---|
| CN | 111591940 | A | 8/2020 | |
| EP | 0403259 | A1 | 12/1990 | |
| EP | 0292018 | B1 | 8/1994 | |
| EP | 0972744 | A2 | 1/2000 | |
| EP | 0974524 | A1 | 1/2000 | |
| EP | 3198283 | A1 | 8/2017 | |
| EP | 3921237 | B1 | 4/2023 | |
| JP | 2002068376 | * | 3/2002 | B67B 7/182 |
| WO | WO-2023158142 | A1 * | 8/2023 | |

* cited by examiner

DECAPPER

FIELD

The present disclosure generally relates to systems and methods for removing a cap of a container, and more particularly to decappers for removing a cap of a container.

BACKGROUND

Containers are used to hold a wide variety of different items or contents, such as pharmaceuticals (e.g., pills, tablets, capsules, and the like), liquids, etc. A typical container or bottle is illustrated in FIG. 1. The container 1 includes a body 2 defining an interior that holds the contents (not shown) and a cap 3 that closes a mouth of the body. The cap 3 is threadably attached to (e.g., screwed) the body 2 to selectively close and open the mouth of the container. Rotating the cap 3 in one direction secures the cap on the body 2 and rotating the cap in the other direction releases the cap on the body. Depending on the contents within the container 1, the container may include a seal 4 (such as a metal, plastic, and/or paper film) secured to and covering the mouth of the body 2, under the cap 3. The seal 4 is typically applied by the filler of the container after the contents are placed in the body 2 but before the cap 3 is screwed thereon. The seal 4 typically forms an air-tight barrier between the atmosphere and the contents within the body 2. The seal 4 also prevents the contents from moving out of the body 2 through the mouth and needs to be removed in order to access the contents within the container 1. The container 1 also has a container longitudinal axis LA extending between the mouth of the body (or cap 3 when the cap is attached to the body) and an opposite base of the body.

SUMMARY

In one aspect, a decapper for removing a cap from a body of a container comprises a base configured to rest on a support surface and a prime mover supported by the base. A cap remover is supported by the base and is rotatable relative to the base about an axis of rotation. The cap remover is arranged to engage the cap of the container. The prime mover is operatively coupled to the cap remover to rotate the cap remover about the axis of rotation to remove the cap from the body of the container when the cap is engaged by the cap remover. The cap remover is arranged relative to the base such that the axis of rotation is oriented generally horizontally when the base rests on the support surface.

In another aspect, a workstation for removing contents from a container comprises a work platform including a collector sized and shaped to receive the contents of the container. The work platform has an upper work surface. The collector includes a tray having a major tray surface (broadly, major collector surface) recessed below the upper work surface. A decapper rests on the upper work surface. The decapper includes a cap remover arranged to engage a cap of the container. The cap remover is rotatable about an axis of rotation to remove the cap from a body of the container when the cap is engaged with the cap remover. The cap remover is arranged relative to the work platform such that the axis of rotation is oriented generally parallel to the upper work surface of the work platform. In an example, the cap remover is arranged relative to the tray such that the axis of rotation is oriented generally parallel to the major tray surface of the tray.

In another aspect, a method of opening a container comprising positioning the container generally horizontally such that a longitudinal axis of the container extending through a cap of the container and a base of the container is generally horizontal; and removing the cap from a remainder of the container while the container is in the generally horizontal position.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
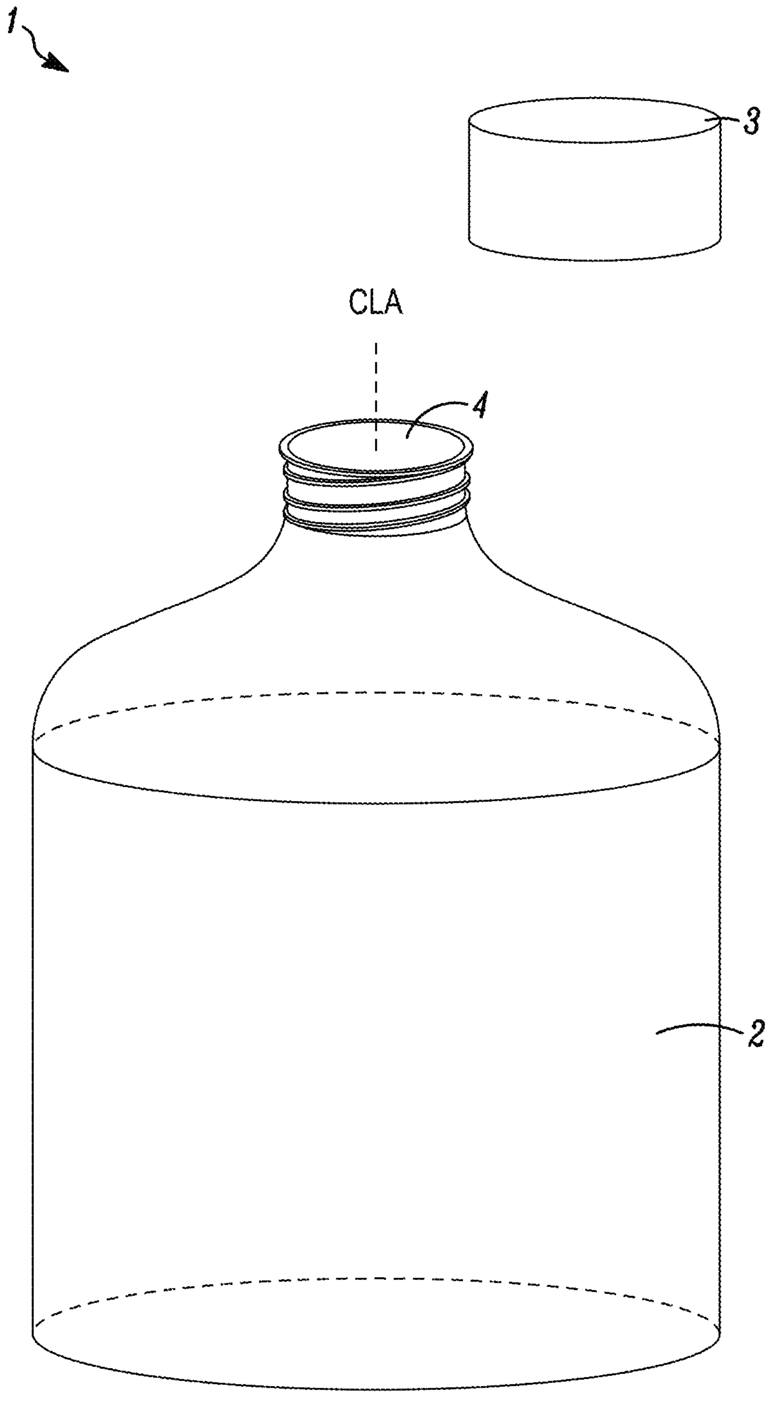
FIG. 1 (PRIOR ART)
FIG. 1 is a perspective of a container.

Referring to the figures, FIG. 1 illustrates a workstation embodying aspects of the present disclosure, indicated generally by reference numeral 10. The illustrated workstation 10 is a bulk-up workstation used in a pharmaceutical order processing systems, such as a high volume pharmaceutical order processing system, to facilitate the fulfilment of a prescription order received by the pharmaceutical order processing system. The prescription order may include one or more pharmaceuticals (e.g., prescription drugs, over the counter drugs, or supplements in solid form, e.g., pills, tablets, caplets, capsules, softgels, gelcaps, sprinkle capsules, sublingual tabs, and other germane structures). Pharmaceutical order processing systems typically involve processes to remove pharmaceuticals from the manufacturer's packaging, transfer the pharmaceuticals to bulk storage containers, retrieve the pharmaceuticals from the bulk storage containers and fill and package the various pharmacy orders. The bulk storage containers can store the drugs from a plurality of manufacture containers. The workstation 10 disclosed herein is used in a pharmaceutical order processing system to remove the pharmaceuticals from the manufacturer's packaging and transfer the pharmaceuticals to bulk storage containers. After the pharmaceuticals are transferred to the bulk storage containers, the bulk storage containers are transported to other components of the pharmaceutical order processing system, such as a high volume filler, where the pharmaceuticals can be used to fill pharmacy orders. Further details on pharmaceutical order processing systems and components thereof may be found in U.S. Pat. Nos. 9,697,335 and 10,865,006, the entireties of which are hereby incorporated by reference. While described in the context of pharmaceutical order processing systems, it will be appreciated that the systems and components disclosed herein can be used in other contexts without departing from the scope of the present disclosure.

An operator or worker uses the workstation 10 to remove the contents (e.g., pharmaceuticals) from a container 1. The workstation 10 is used to "bulk-up" pharmaceuticals for filling orders in the pharmaceutical order processing system—e.g., remove the pharmaceuticals from the container 1 in order to move the pharmaceuticals (e.g., a plurality of solids) into a bulk container (not shown). Generally speaking, "bulking-up" includes transferring the pharmaceuticals contained by a plurality of containers 1 (which may be the same or different sizes) into a single bulk container to be used with subsequent components of the pharmaceutical order processing system. Specifically, at the workstation 10, the worker opens one or more containers 1 (which have a relatively small volume), removes the pharmaceuticals from the containers 1, and transfers the pharmaceuticals into relatively large volume bulk containers. A bulk container can be similar to container 1, but without a neck and a cap that has a diameter similar to the diameter of body of the container. In an example, the bulk container is lined with a polymer bag before the solids are poured therein. Typically, the containers 1 come from the pharmaceutical manufacturer. The volume of the bulk container can be ten or more times larger than the volume of each container 1. In an example, the bulk container has a volume of five times or more of the container 1. For example, the bulk container can be about a liter or about a gallon in volume.

The workstation 10 includes a work platform or countertop 12. The work platform 12 has an upper, generally horizontal, work surface 14. The work platform 12 has opposite first and second sides and a work platform longitudinal axis WLA extending between the first and second sides. In an example, the work platform is planar and includes the axis WLA. The workstation 10 includes a work space 16 above the work surface 14. The work space 16 may be partially enclosed by a rear wall and opposite side walls. The workstation 10 includes a collector 18 (e.g., pharmaceutical collector) generally disposed at or on the work surface 14 for loading the contents of the container 1 into a bulk container. In some embodiment, the collector may be an area or section of the work surface. The pharmaceutical collector 18 receives the pharmaceuticals from the containers 1. The worker then uses the pharmaceutical collector 18 to move the pharmaceuticals into the bulk container. The operator can shift through the pharmaceuticals received by the pharmaceutical collector 18 to remove damaged or broken pharmaceuticals and other contaminants. The pharmaceutical collector 18 includes a receiver or tray 20 sized and shaped to receive the contents of the container 1. The pharmaceutical collector 18 may also include a chute 22 which guides the contents of the container 1 into the bulk container positioned below. The workstation 10 includes a bulk container space disposed below the chute 22 for positioning the bulk container to receive the pharmaceuticals from the container 1. A door 30 selectively opens and closes the chute 22. The operator can open the door 30 and move or slide the pharmaceuticals into the chute 22 to deposit the pharmaceuticals into the bulk container. The work platform 12 also includes (e.g., defines) a trash opening 24 sized and shaped to receive waste (such as the cap 3 of the container 1, the body 2 of the container, the seal 4 of the container, items not part of the container, etc.) to fall therethrough and into a trash bin 26 of the workstation 10. The workstation 10 includes a trash container space disposed below the trash opening 24 for positioning the trash bin 26 to receive the waste. In the illustrated embodiment, the trash opening 24 is adjacent to one side of the tray 20 and the chute 22 is adjacent the opposite side of the tray. The workstation 10 (e.g., collector 18) may also include a dust screen 28 for filtering the pharmaceuticals from debris (e.g., dust). In one embodiment, the dust screen 28 is movable (e.g., pivotable) down over the tray 20. In this embodiment, the worker dumps the contents of the container 1 on the dust screen 28. The pharmaceuticals remain on the dust screen 28 while any small debris falls through the dust screen into the tray 20 positioned below. The worker can also move the pharmaceuticals around on the dust screen 28 to inspect the pharmaceuticals for other debris, cotton wadding, and/or broken pharmaceuticals. After inspection, the pharmaceuticals are moved into the chute 22, such as by pivoting one side of the dust screen 28 upward to dump the pharmaceuticals into the chute. Other configurations of the workstation are within the scope of the present disclosure. Further details on workstations are described in U.S. Pat. No. 10,865,006, incorporated by reference above.

Referring to FIGS. 2-6, a decapper of the present disclosure suitable for use with the workstation 10 is generally indicated by reference numeral 100. While described within the context of workstation 10, it is understood the decapper 100 can be used in other contexts without departing from the scope of the present disclosure. The worker uses the decapper 100 to quickly and easily remove the cap 3 from the body 2 of the container 1, before dumping the contents onto the collector 18. The decapper 100 rests on the work surface 14. For reasons that will become apparent, desirably, the decapper 100 is positioned adjacent the trash opening 24. In the illustrated embodiment, the decapper 100 is positioned between the trash opening 24 and the collector 18.

The decapper 100 includes a base 102 configured to rest on the work surface 14 (broadly, a support surface). In an example embodiment, the decapper 100 (e.g., base 102) is fixed to the work surface 14. The base 102 has a front end and a rear end and a longitudinal axis LA extending between the front and rear ends. The base 102 may include anti-slip feet or an anti-slip pad arranged to engage the work surface 14 to prevent the decapper 100 from sliding on the work surface. In one embodiment, the base 102 may include a support or mount 103 (FIG. 6) for securing the base 102 to the work surface 14 (broadly, the work platform 12). In one example, the mount 103 may include a magnet (e.g., a permanent magnet or an electro-magnet that can be turned on and off) for securing the base 102 to the work surface 14. In another example, the mount 103 may include a suction cup for securing the base 102 to the work surface 14. In another example, the mount 103 may include a clamp configured to clamp onto the work platform 12. Other ways of mounting and securing the base to a work platform are within the scope of the present disclosure. For example, in one embodiment, the base may include one or more fastener openings for receiving fasteners (e.g., bolts, screws, etc.) used to secure the base to the work surface. In one embodiment, the base may include a selectively positionable pivot mechanism, such as a ball head, swivel plate, or any other suitable pivot mechanism, to selectively position a remainder (such the cap remover 108 described below) of the decapper 100 relative to the base, after the base is secured to the work platform 12. In one embodiment, the base 102 may include a height adjustment mechanism, such as an adjustable or telescoping pole, for selectively changing a height of the remainder of the decapper 100 relative to the base. The base 102 may include one or more of these components. Other configurations of the base are within the scope of the present disclosure.

The decapper 100 includes a prime mover 106 and a cap remover 108. The prime mover 106 and the cap remover 108 are each supported by the base 102. In the illustrated embodiment, the decapper 100 includes a support 104 coupled to the base 102 and also supporting the prime mover 106 and the cap remover 108. In the illustrated embodiment, the prime mover 106 comprises an electric motor, although other suitable prime movers are within the scope of the present disclosure such as a pneumatic motor or a hydraulic motor. A power cord 107, connected to an electrical outlet, supplies electrical power to the prime mover 106. The prime mover 106 is operatively coupled to the cap remover 108, via a shaft 109, to move the cap remover. The cap remover 108 is arranged to engage the cap 3 of the container 1. The cap remover 108 is configured to remove the cap 3 of the container 1 when moved by the prime mover 106. The cap remover 108 is rotatable relative to the base 102 about an axis of rotation AR. The prime mover 106 rotates the cap remover 108 about the axis of rotation AR to remove the cap 3 from the body 2 of the container 1 when the cap is engaged with the cap remover. In particular, with the cap 3 engaged with the cap remover 108, the cap and the cap remover move together such that when the prime mover 106 rotates the cap remover, the cap rotates with the cap remover and unscrews from the threads of the body 2 of the container 1. The prime mover 106 rotates the cap remover 108 in a counter-clockwise direction (when viewed from the front of the decapper 100). In the illustrated embodiment, the cap remover 108 comprises a chuck 110 defining a cap receiving space 112 sized and shaped to receive the cap 3 of the container 1. The chuck 110 may include a grip or lining 114 arranged to engage the cap 3. In the illustrated embodiment, the lining 114 borders the cap receiving space 112 for engaging the cap 3 of the container 1. The lining 114 may comprise a high friction material, such as rubber, to ensure the cap 3 moves (e.g., rotates) with the cap remover 108 when the cap remover is moved by the prime mover 106. In one embodiment, the decapper 100 includes a set of cap removers 108, each of a different size and/or shape to remove different sizes and/or shapes of caps 3. For example, the decapper 100 can include a set of three cap removers 108, one having a large diameter, one having a medium diameter, and one having a small diameter for removing large, medium and small caps 3, respectively. In this embodiment, each cap remover 108 can be removeably coupled to the shaft 109. Other configurations of the cap remover are within the scope of the present disclosure.

In the illustrated embodiment, the prime mover 106 is configured to rotate the cap remover 108 about the axis of rotation AR when the cap remover is engaged by the cap 3 of the container 1. The decapper 100 includes a switch 120 (FIG. 6) communicatively coupled to the prime mover 106. The switch 120 is also operatively coupled to the cap remover 108. The cap remover 108 and the shaft 109 can move (e.g., slide) linearly along the axis of rotation AR. This linear motion opens and closes the switch 120. In operation, when the worker engages the cap 3 of the container 1 with the cap remover 108, the cap remover and shaft 109 slide generally rearwardly, closing the switch 120, which activates the prime mover 106, thereby rotating the cap remover. A spring (not shown) biases the cap remover 108 and shaft 109 generally forwardly such that when the worker removes the container 1 from the cap remover, the cap remover and shaft move forward thereby opening the switch 120 and deactivating the prime mover 106. This allows a worker to operate the decapper 100 with only the hand holding and moving the container 1 into engagement with the cap remover 108. In other embodiments, the decapper may include a manually operable on/off switch, such as a foot actuated switch or finger actuated switch, for turning the prime mover 106 on and off.

The cap remover 108 is arranged relative to the base 102 such that the axis of rotation AR is oriented generally horizontally when the base rests on the work surface 14. In other words, the cap remover 108 is arranged relative to the work platform 12 such that the axis of rotation AR is oriented generally parallel to the work surface 14 (broadly, a horizontal plane). As used herein, the axis of rotation AR being "oriented generally horizontally" or "oriented generally parallel" to the work surface 14 means an angle between the axis of rotation and a horizontal plane (such as the horizontal plane the work surface lies in) is less than 45 degrees when the base 102 rests on the work surface. More desirably, the angle between the axis of rotation AR and the horizontal plane is less than 30 degrees, more desirably the angle is less than 20 degrees, more desirably the angle is less than 15 degrees, more desirably the angle is less than 10 degrees, more desirably the angle less than 5 degrees, and even more desirably the axis of rotation AR is parallel to the horizontal plane (e.g., the angle is 0 degrees) when the base 102 rests on the work surface 14. In an example embodiment, the axis of rotation AR is not vertical and not at 90 degrees relative to the work surface. Such an orientation of the cap remover 108 (e.g., the orientation of the axis of rotation AR), in addition to the switch 120 described above, allows the decapper 100 to be operated by the worker with only one hand—the hand holding and moving the container 1 into engagement with the decapper 100. Conventional vertically oriented decappers typically require the user to use one hand to hold the container and the other hand to operate the vertically oriented decapper. In addition, this orientation of the cap remover 108 better controls the movement of the cap 3 after the cap is removed from the body 2 of the container 1. Due to the orientation of the cap remover 108, the cap 3 falls generally downward, directly below the cap remover, once the cap is removed from the body 2 of the container 1. With conventional vertically oriented decappers, one possibility is that the caps can fly outward in generally any radial direction once the cap is unscrewed from the body 2 of the container 1. Another possibility with conventional vertically oriented decappers is that the caps may be retained by the conventional vertically oriented decapper after removal in which case the operator has to take the additional step of manually removing the cap from the conventional decapper. It can be undesirable for a user to insert a finger into the cap remover 108. Yet still another drawback of conventional vertically oriented decappers is that even though the cap is unscrewed from the body 2 of the container 1, the cap may rest on top of the body (due to gravity and some minor interference between the cap and the body) in which case the operator has to take the additional step of manually removing (e.g., lifting or knocking) the cap off of the body.

The decapper 100 includes a cap guide 116 arranged to receive and guide the cap 3 after the cap is removed from the body 2 of the container 1 by the cap remover 108. In the illustrated arrangement, the cap guide 116 is arranged to guide the cap 3 toward the trash opening 24 after the cap is removed by the cap remover 108. Using the gap guide 116 to direct the cap 3 to the trash opening 24, and into the trash bin 26, after the cap is removed from the body 2 of the container 1 eliminates the worker from having to manually move the cap to the trash bin, saving time and effort. The cap guide 116 is disposed below (e.g., directly below) the cap remover 108 to receive the cap 3 when the cap falls from the cap remover. In the illustrated embodiment, the gap guide 116 comprises a ramp 118 having an inclined surface arranged to guide the cap 3 away from the decapper 100. The inclined surface of the ramp 118 is arranged to guide the cap 3 off of a side of the decapper 100 and toward the trash opening 24. In the illustrated embodiment, the cap guide 116 is part of the base 102 (broadly, supported by the base). In the illustrated embodiment, the inclined surface of the ramp

118 is generally planar and set at a fixed angle relative to the horizontal. Desirably, the angle of the inclined surface of the ramp 118 relative to the horizontal is within the inclusive range of about 20 degrees to about 60 degrees. In one embodiment, the angle of the inclined surface of the ramp 118 is adjustable. For example, a selectively securable hinge connection can be used to connect the ramp 118 to the rest of the base 102 to selectively adjust the angle of the inclined surface. In one embodiment, the inclined surface of the ramp 118 may be arcuate. In one embodiment, the upper portion of the cap guide may include a wall or a lip extending generally upward to help direct the cap onto the ramp when the cap falls down from the cap remover.

In the illustrated embodiment, the cap remover 108, the shaft 109, and the prime mover 106 are part of a self-contained cap remover assembly 122. The cap remover assembly 122 includes a housing 124 supporting the cap remover 108, the shaft 109, and the prime mover 106. The cap remover assembly 122 is removeably coupled to the support 104. In the illustrated embodiment, the support 104 includes a first support member 104A and a second support member 104B releasably secured to the first support member with one or more fasteners (e.g., bolts, screws, etc.). The first and second support members 104A, 104B define a compartment sized and shaped to receive and hold the cap remover assembly 122. The first and/or second support members 104A, 104B include one or more keys (not shown) arranged to engage the housing 124 of the cap remover assembly 122 to prevent the cap remover assembly from rotating relative to the support 104. In other embodiments, the cap remover, the shaft, and the prime mover may be an integral part of the support.

Figure 2:
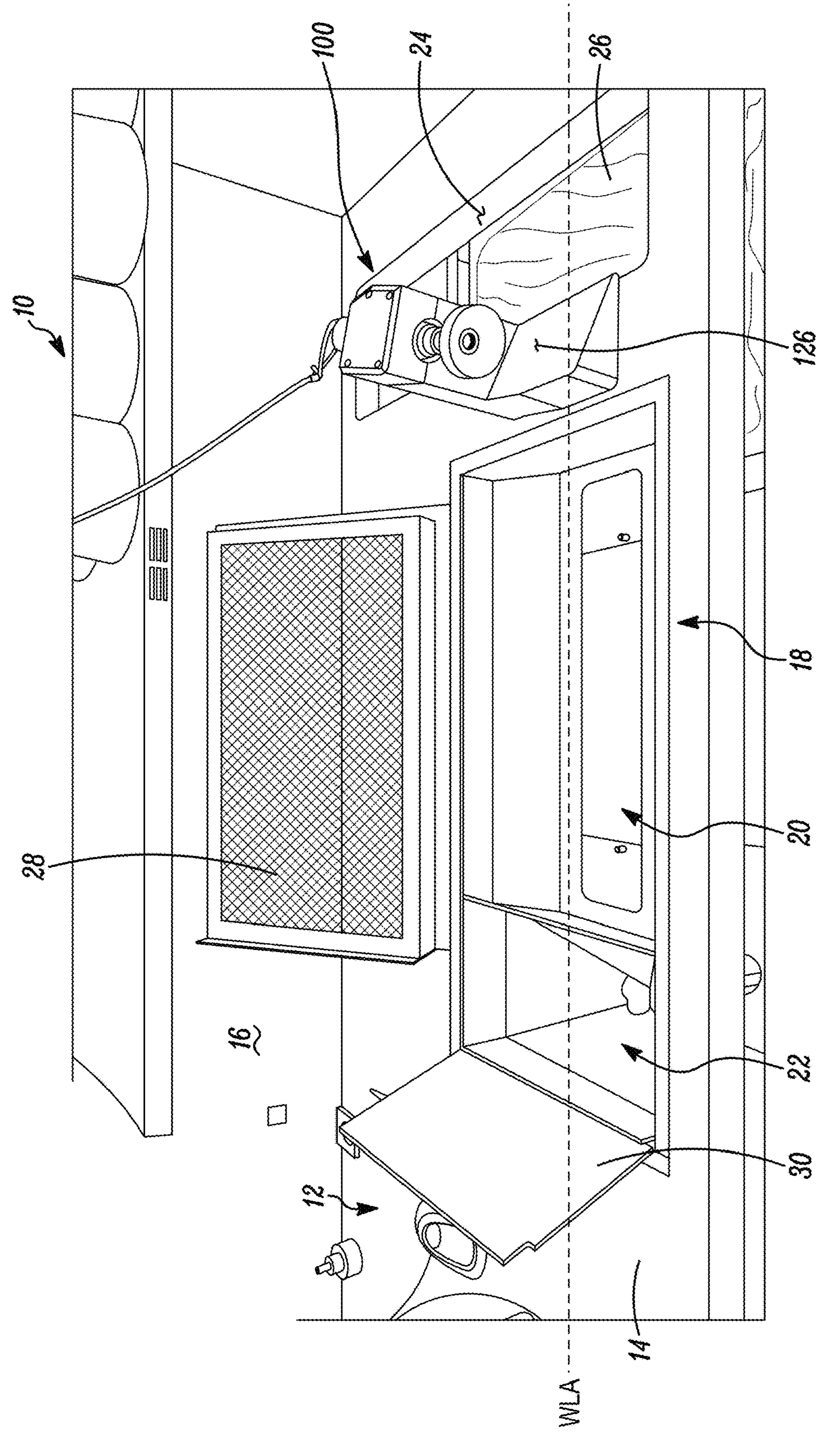
FIG. 2 is a perspective of a workstation according to one embodiment of the present disclosure.
Figure 3:
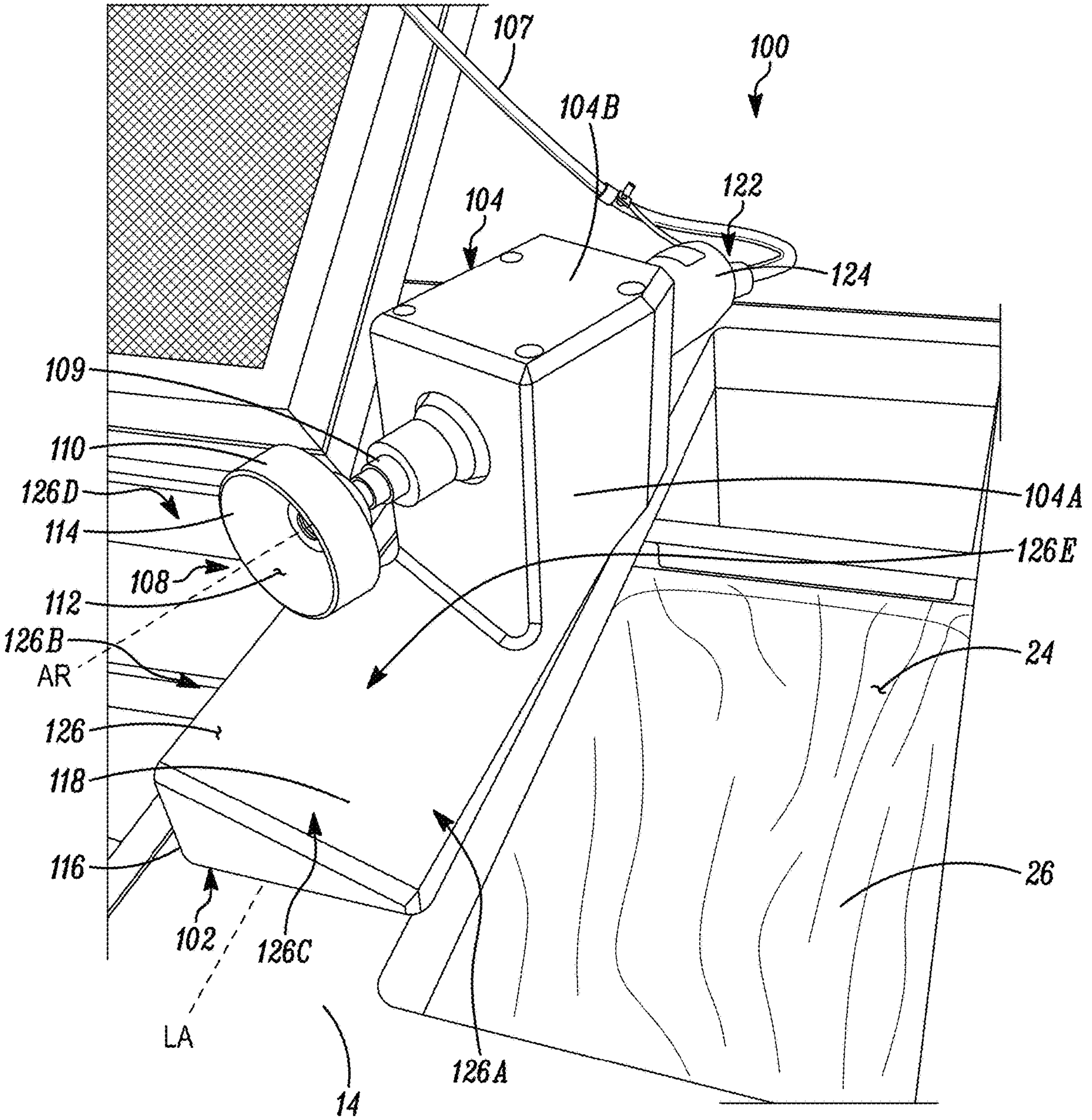
FIG. 3 is a perspective of a decapper according to one embodiment of the present disclosure.
Figure 4:
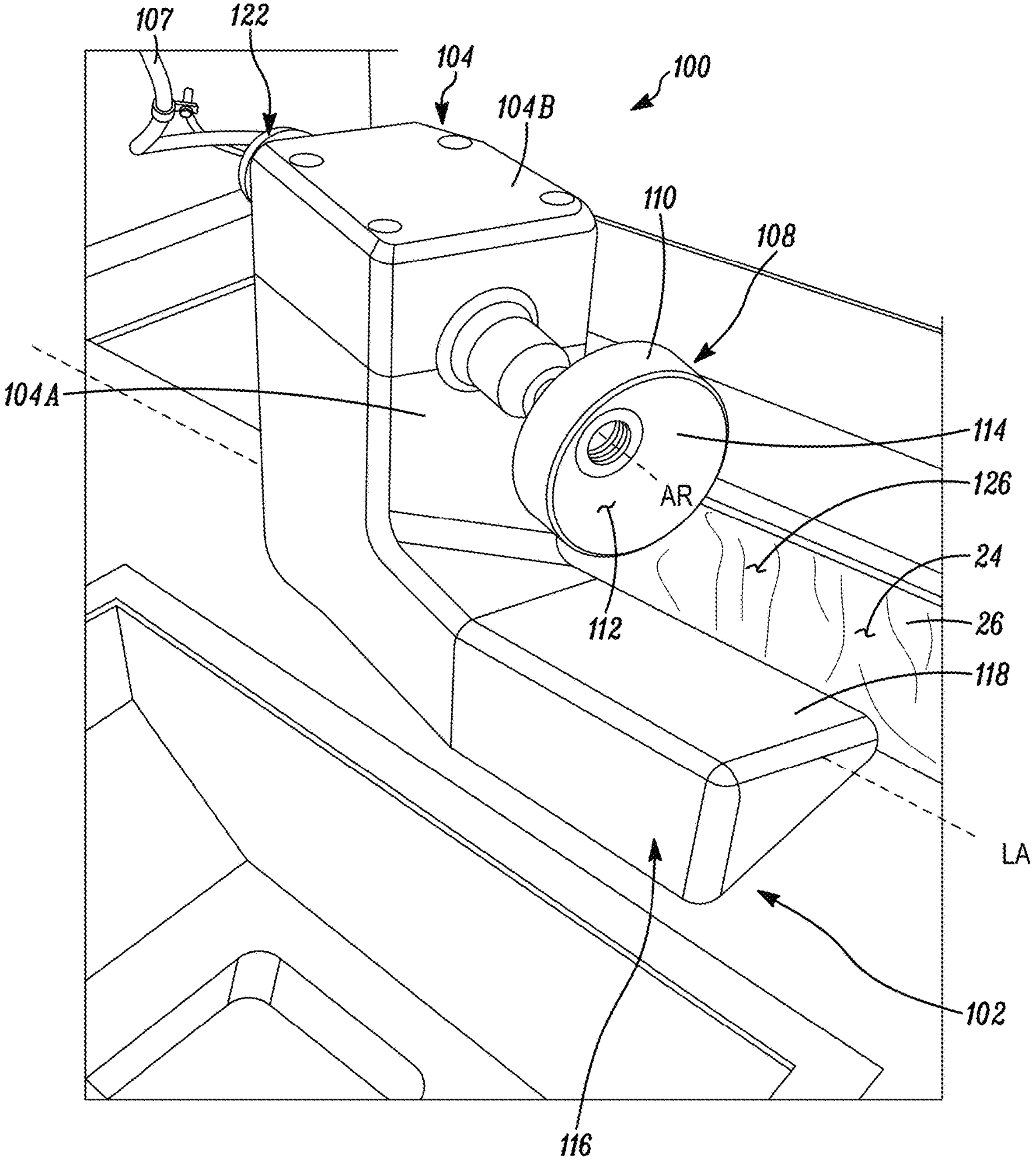
FIG. 4 is another perspective of the decapper.
Figure 5:
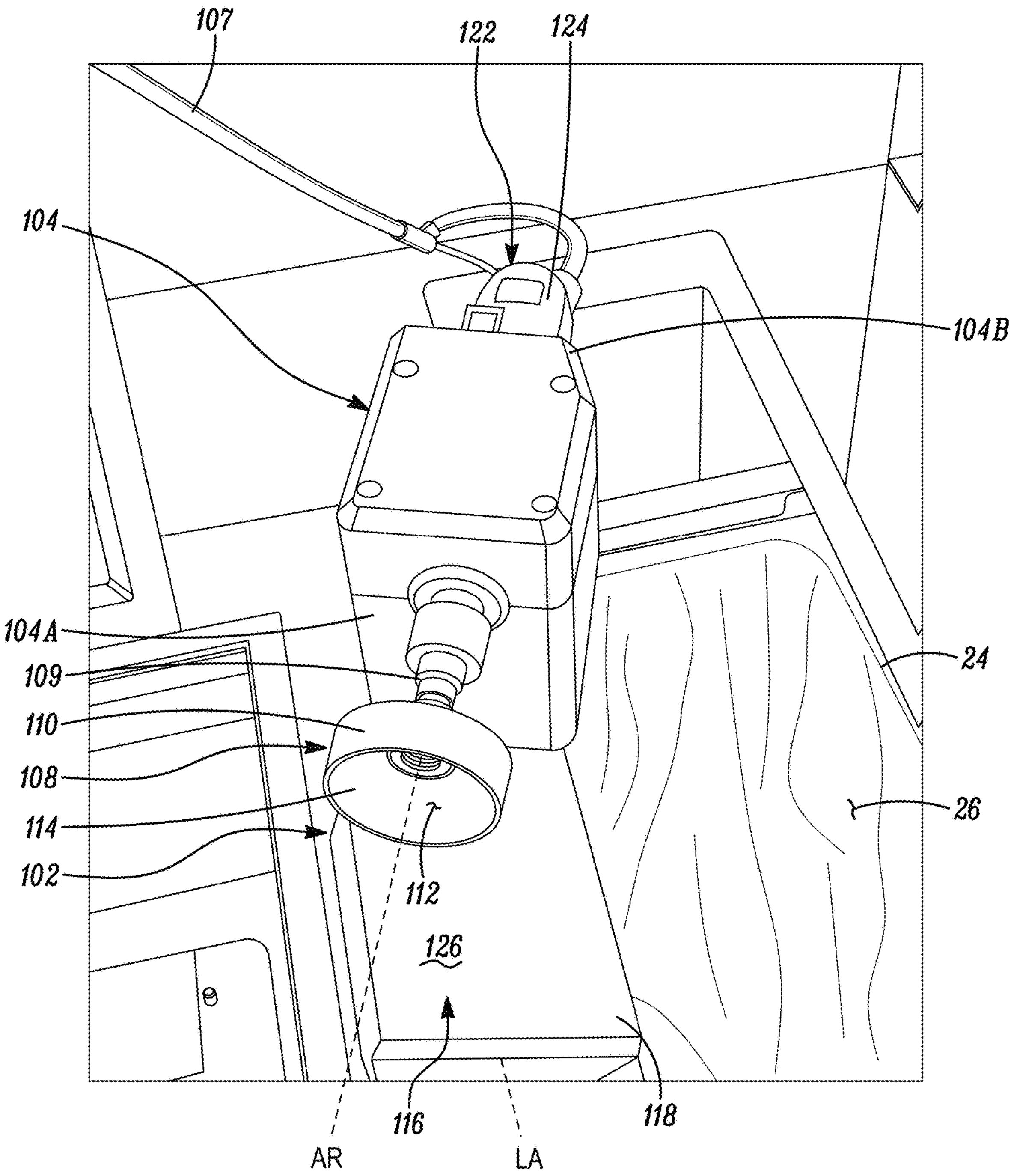
FIG. 5 is another perspective of the decapper.
Figure 6:
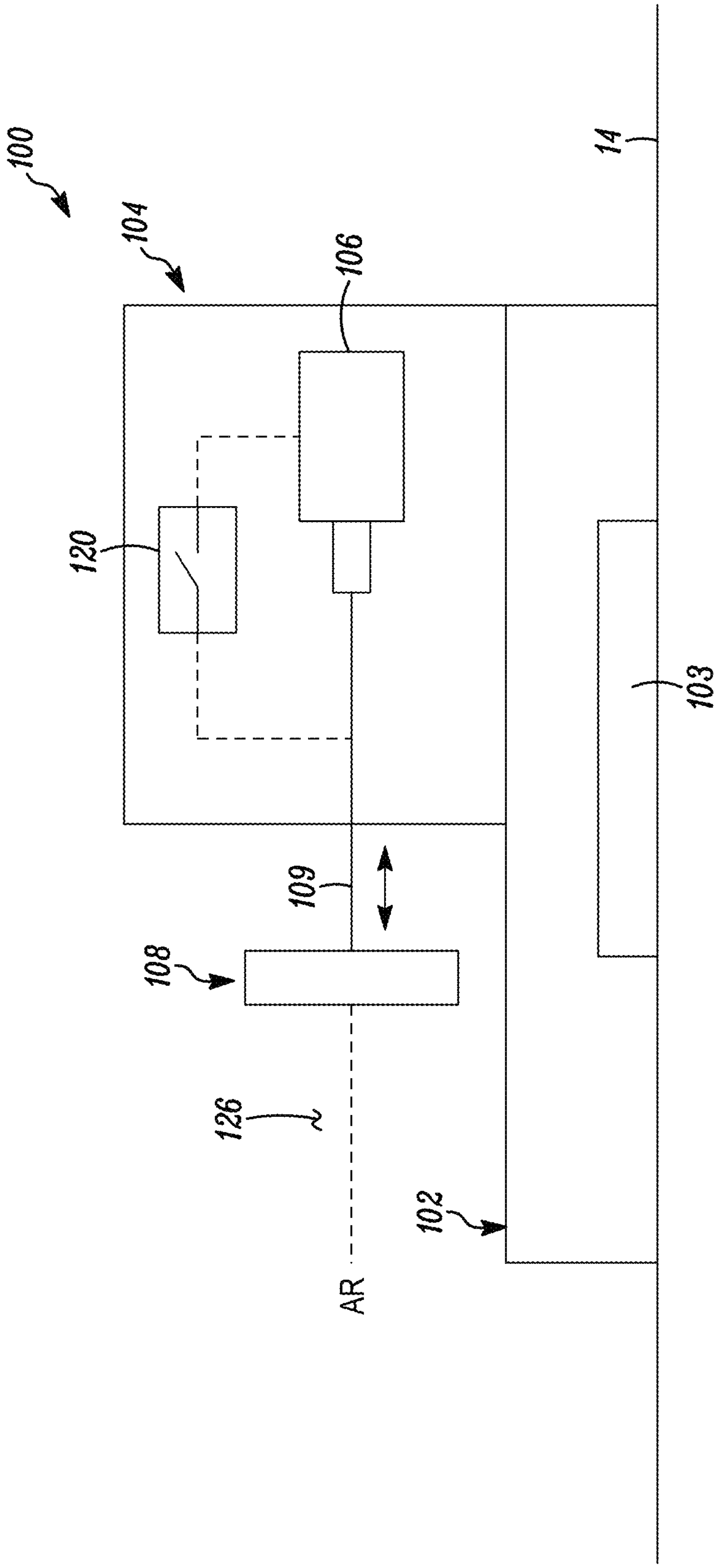
FIG. 6 is a schematic illustration of the decapper.

Referring to FIGS. 2 and 5, the cap remover 108 is arranged relative to the base 102 such that the axis of rotation AR is skewed with respect to the longitudinal axis LA of the base and the longitudinal axis WLA of the work platform 12. This arrangement angles the cap remover 108 toward the collector 18 and the worker, who will typically be positioned in front of the collector 18, making it easier for the worker to insert the cap 3 into the cap remover, e.g., by gripping the container on which the cap 3 is affixed. In the illustrated embodiment, the axis of rotation AR is set at a fixed skew angle relative to the longitudinal axis LA of the base 102 and the longitudinal axis WLA of the work platform 12. In other embodiments, the skew angle is adjustable. For example, mount may include a selectively positionable pivot mechanism, such as a ball head, swivel plate, or any other suitable pivot mechanism, to selectively position the axis of rotation relative to the base.

Referring back to FIGS. 2-6, the decapper 100 includes an unenclosed space 126 forward of the cap remover 108. The unenclosed space 126 provides access to the cap remover 108 from a front of the decapper (e.g., through an open front of the unenclosed space). Desirably, and as illustrated, the unenclosed space 126 provides unobstructed access to the cap remover 108 from the front of the decapper. In the illustrated embodiment, the unenclosed space 126 has open left and right sides 126A, 126B, an open front 126C, and an open upper end 126D. The lower end of the unenclosed space 126 is bordered by the cap guide 116 and the rear 126E of the unenclosed space is bordered by the cap remover 108. The unenclosed space 126 enables the worker to quickly and easily insert the cap 3 of the container 1 into the cap remover 108.

In operation, the worker uses the decapper 100 to remove the cap 3 from the body 2 of the container 1. In one method of operation, the worker may first scan a barcode (not shown) of the container 1 with a scanner (not shown) to ensure the container with the correct contents has been selected. After, the worker removes the cap 3 from the body 2 of the container 1 using the decapper 100. The worker positions the container 1 generally horizontally such that the container longitudinal axis CLA is generally horizontal. The worker substantially aligns the container longitudinal axis CLA with the axis of rotation AR and then moves the container 1 along the axis of rotation to insert the cap 3 into the cap remover 108. Inserting the cap 3 into the cap remover 108 also pushes the cap remover rearward, closing the switch 120 and activating the prime mover 106 which rotates the cap remover. As the cap remover 108 rotates, the cap remover unscrews the cap 3 from the threads on the body 2 of the container 1, thereby removing the cap. This all occurs while the container 1 is in the generally horizontal position. Broadly, the cap 3 is removed from a remainder of the container 1 while the container 1 is in the generally horizontal position. Because the container 1 includes the seal 4, the seal prevents the contents of the container inadvertently spilling out of the body 2 when the container is in the horizontal position and the cap 3 is removed. After the cap 3 is removed, the body 2 of the container 1 is moved away from the cap remover. As a result, the cap remover 108 moves forward, opening the switch 120, and the prime mover 106 stops rotating the cap remover. Also, the cap falls downward onto the cap guide 116 which directs the cap toward the trash bin 26. With the cap 3 removed, the worker then removes the seal 4 and dumps the contents of the container on the collector 18, such as either on the dust screen 28 (which retains the pharmaceuticals while debris falls down onto the tray 20 below) or directly into the tray. The worker may then count, analyze, inspect, etc. the contents of the container 1 before moving the contents into the chute 22, which guides the contents into the bulk container. The worker can then repeat the process with the next container 1.

While some of the embodiments described herein discuss a user engagement of the decapper with a container, it is within the scope of the present disclosure to have a robot, e.g., a six axis co-robot, that retrieves a capped container 3 and engages the decapper to remove the cap. The removed cap would automatically fall from the container with the robot's gripper holding the container. The robot would then move the decapped container to the tray and pour the solids, e.g., pills, into the tray. The robot can repeat this process.

It is apparent that the elements, features, and/or teachings set forth in each embodiment disclosed herein are not limited to the specific embodiment(s) in which the elements, features and/or teachings are explicitly described. Accordingly, it is understood that the elements, features and/or teachings described in one embodiment may be applied to one or more of the other embodiments disclosed herein, even if said elements, features and/or teachings where not described herein as being a part of said one or more of the other embodiments.

The Title, Field, and Background are provided to help the reader quickly ascertain the nature of the technical disclosure. They are submitted with the understanding that they will not be used to interpret or limit the scope or meaning of the claims. They are provided to introduce a selection of concepts in simplified form that are further described in the Detailed Description. The Title, Field, and Background are not intended to identify key features or essential features of the claimed subject matter, nor is it intended to be used as an aid in determining the claimed subject matter.

When introducing elements of aspects of the disclosure or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that several advantages of the aspects of the disclosure are achieved and other advantageous results attained.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the aspects of the disclosure by way of example and not by way of limitation. This description enables one skilled in the art to make and use the aspects of the disclosure, and describes several embodiments, adaptations, variations, alternatives and uses of the aspects of the disclosure, including what is presently believed to be the best mode of carrying out the aspects of the disclosure. Additionally, it is to be understood that the aspects of the disclosure is not limited in its application to the details of construction and the arrangement of components set forth in the description or illustrated in the drawings. The aspects of the disclosure are capable of other embodiments and of being practiced or carried out in various ways. Also, it will be understood that the phraseology and terminology used herein is for the purpose of description and should not be regarded as limiting.

Having described aspects of the disclosure in detail, it will be apparent that modifications and variations are possible without departing from the scope of aspects of the disclosure as defined in the appended claims. It is contemplated that various changes could be made in the above constructions, products, and methods without departing from the scope of aspects of the disclosure. In the preceding specification, various embodiments have been described with reference to the accompanying drawings. It will, however, be evident that various modifications and changes may be made thereto, and additional embodiments may be implemented, without departing from the broader scope of the aspects of the disclosure as set forth in the claims that follow. The specification and drawings are accordingly to be regarded in an illustrative rather than restrictive sense.

What is claimed is:

1. A decapper for removing a cap from a body of a container, the decapper comprising:

a base configured to rest on a support surface;

a prime mover supported by the base;

a cap remover supported by the base, the entire cap remover being rotatable relative to the base about an axis of rotation, the cap remover arranged to engage the cap of the container, the prime mover operatively coupled to the cap remover to rotate the entire cap remover about the axis of rotation to remove the cap from the body of the container, the cap remover being arranged relative to the base such that the axis of rotation is oriented generally horizontally when the base rests on the support surface;

the decapper defining a space forward of the cap remover, the space providing access to the cap remover, the cap remover bordering a rear of the space, the space having an open front providing unobstructed access to the cap remover from a front of the decapper and an open side providing unobstructed access to the cap remover from a side of the decapper, the open side extending from the rear of the space to the open front of the space;

a cap guide arranged to receive the cap after the cap is removed from the body of the container by the cap remover;

wherein the cap guide comprises a ramp having an inclined surface arranged to guide the cap away from the decapper.

2. The decapper of claim 1, wherein the inclined surface of the ramp is arranged to guide the cap off a side of the decapper.

3. The decapper of claim 1, wherein the cap guide is part of the base.

4. The decapper of claim 1, wherein the prime mover is configured to rotate the cap remover about the axis of rotation when the cap remover is engaged by the cap of the container.

5. The decapper of claim 4, further comprising a shaft operatively connecting the prime mover to the cap remover, wherein the cap remover has a cap receiving space sized and shaped to receive the cap of the container, the cap remover having a surface bordering a rear of the cap receiving space and configured to be engaged by the cap of the container, the surface of the cap remover and the shaft being moveable together longitudinally along the axis of rotation.

6. The decapper of claim 5, further comprising a switch configured to activate the prime mover, the switch configured to be closed in response to the shaft moving rearwardly along the axis of rotation to activate the prime mover and rotate the cap remover.

7. The decapper of claim 1, wherein the cap remover comprises a chuck defining a cap receiving space sized and shaped to receive the cap of the container.

8. The decapper of claim 1, wherein the base has a front end and a rear end and a longitudinal axis extending between the front and rear ends, the cap remover being arranged relative to the base such that the axis of rotation is skewed with respect to the longitudinal axis.

9. The decapper of claim 1, wherein the base borders a bottom of the space and extends forward of the cap remover.

10. The decapper of claim 1, wherein the space has an open top providing unobstructed access to the cap remover from a top of the decapper.

11. The decapper of claim 1, wherein the cap remover is arranged relative to the base such that an angle between the axis of rotation and a horizontal plane is less than 30 degrees when the base rests on the support surface.

12. The decapper of claim 11, wherein the cap remover is arranged relative to the base such that the angle between the axis of rotation and the horizontal plane is less than 15 degrees when the base rests on the support surface.

13. The decapper of claim 12, wherein the cap remover is arranged relative to the base such that the axis of rotation is parallel to the horizontal plane.

14. The decapper of claim 1, wherein the open side is an open left side providing unobstructed access to the cap remover from a left side of the decapper, and wherein the space has an open right side providing unobstructed access to the cap remover from a right side of the decapper, the open right side extending from the rear of the space to the open front of the space.

15. The decapper of claim 14, wherein the space has an open top providing unobstructed access to the cap remover from a top of the decapper, the open top extending from the rear of the space to the open front of the space.

16. The decapper of claim 15, wherein the open left side and the open right side are contiguous with the open top of the space.

17. The decapper of claim 1, wherein a front of the base is vertically aligned with the open front of the space.

18. The decapper of claim 1, further comprising a self-contained cap remover assembly comprising the prime mover and the cap remover, the self-contained cap remover assembly being releasably coupleable to the base.

19. The decapper of claim 18, further comprising a first support member and a second support member, the first and second support members being releasably coupleable to one another, the first and second support members being configured to couple the self-contained cap remover assembly to the base when the first and second support members are coupled together.

* * * * *